(12) United States Patent
Louchart, III et al.

(10) Patent No.: US 6,220,572 B1
(45) Date of Patent: Apr. 24, 2001

(54) QUICK ADJUSTING ENVELOPE SPREADER ARM

(75) Inventors: Theophile Henry Louchart, III, Roebuck; Robert C. Springman, Greer; Nicholas P. Marck, Moore, all of SC (US)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 09/467,346

(22) Filed: Dec. 20, 1999

(51) Int. Cl.[7] .................................................... B60C 25/14
(52) U.S. Cl. ......................................... 254/50.1; 269/48.1
(58) Field of Search ............................ 254/50.1; 269/48.1

(56) References Cited

U.S. PATENT DOCUMENTS

| | | | |
|---|---|---|---|
| 4,624,732 | * | 11/1986 | King ........................................ 156/95 |
| 5,658,419 | * | 8/1997 | Herron et al. ..................... 156/394.1 |

* cited by examiner

*Primary Examiner*—David A. Scherbel
*Assistant Examiner*—Daniel Shanley
(74) *Attorney, Agent, or Firm*—Martin Farrell; Robert R. Reed

(57) ABSTRACT

A quick adjusting arm for an envelope spreader includes a bar member mounted to an articulated arm of the envelope spreader and a sleeve with a hook installed on the bar member. The bar member has a plurality of adjusting holes to position the sleeve at a selected position. The sleeve includes a single positioning hole, and a quick release pin, for example, a spring ball pin, is inserted through the positioning hole and the selected adjusting hole.

7 Claims, 4 Drawing Sheets

QUICK ADJUSTING ENVELOPE SPREADER ARM

BACKGROUND AND SUMMARY

In certain tire retreading operations, molded and cured tread strips are attached to the buffed tire casing with a cushion gum layer. The assembled casing and new tread are placed in a pressure and heat controlled chamber (autoclave) to cure the cushion gum layer bonding the tread to the casing. To ensure the uniform application of pressure and heat to the assembly, each assembled tire is first placed in an envelope. The envelope is a toroid-shaped bag that encloses the outer surface of the tire and is evacuated before the tire is placed in the chamber. The envelope provides a uniform surface for transmitting pressure and heat effectively to the outer surface of the tire. Envelopes are made of elastomeric sheet material and are typically elasticized to help conform to the outer surface of the tire. To place a tire casing and tread assembly in an envelope, the envelope must be spread and held open sufficiently wide to accept the assembly.

Envelope spreader machines are available commercially, for example, the "Enveloper" available from Matteuzzi USA, Colonial Heights, Va., the "Envelope Spreader" from TRM srl, Italy, and the "Olson Envelope Expander" from Olson Equipment Co., Mt. Pleasant, Mich. These machines include several, typically eight, articulated arms that rotate to spread open the envelope. The articulated arms include a major or swing arm mounted for pivoting on a frame and driven by a pneumatic drive system, and a second arm pivotally fastened to the swing arms and having a hook or jaw member at a free end to engage the edge of the envelope. The hooks hold the envelope edge in a relative circular orientation so that pivoting of the swing arms with follower movement of the second arms spreads the edges to form an opening for the tire.

An envelope spreader machine must typically accommodate tires ranging from light truck sizes to large long haul double width tires. Because conventional spreaders move the arms between two fixed positions, adjustments for tire size are made by changing the length the hook member extends from the swing arm. The hooks typically have shanks with two or three mounting holes and are bolted to the arm joint. Even with a power driven wrench, removing and reinstalling the bolts to change the hook position takes several minutes for each arm.

The present invention overcomes the deficiencies in the art with a quick adjusting hook member that allows the hook and swing arm adjustment to be made quickly and easily.

According to a preferred embodiment of the invention, a spreader arm is mounted to the swing arm of a spreader at a fixed point. The spreader arm has a plurality of adjusting holes spaced along its length. A sleeve or collar is slidably mounted on the spreader arm and includes a positioning hole with a removable pin to engage one of the adjusting holes. A jaw for engaging the envelope is fastened at the end of the sleeve.

According to an alternative embodiment, the sleeve is attached to the swing arm for pivoting movement and the arm is slidably inserted in the sleeve.

The sleeve and pin can be positioned at any of the adjustment holes to provide the desired length relationship with the swing arm. In addition, the pin is a quick release spring ball pin for fast removal and insertion in the adjustment holes.

The sleeve securely engages the spreader arm to prevent unwanted movement of the jaw relative to the spreader arm, both for operator safety and reliable functioning of the spreader machine.

DETAILED DESCRIPTION

Figure 1:
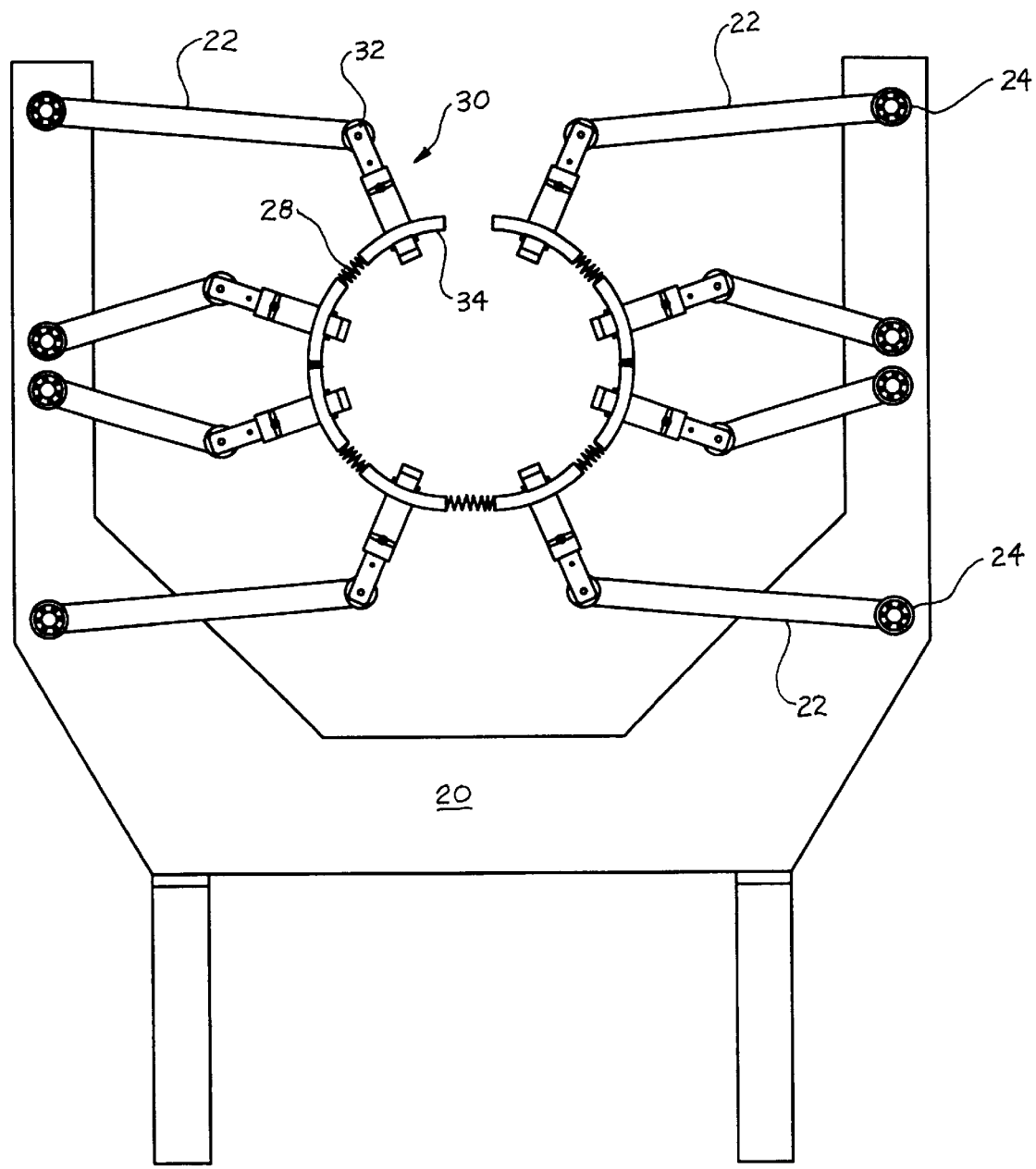
FIG. 1 is a front view of an envelope spreader with quick adjusting spreader arms in accordance with the invention in a closed position.
Figure 2:
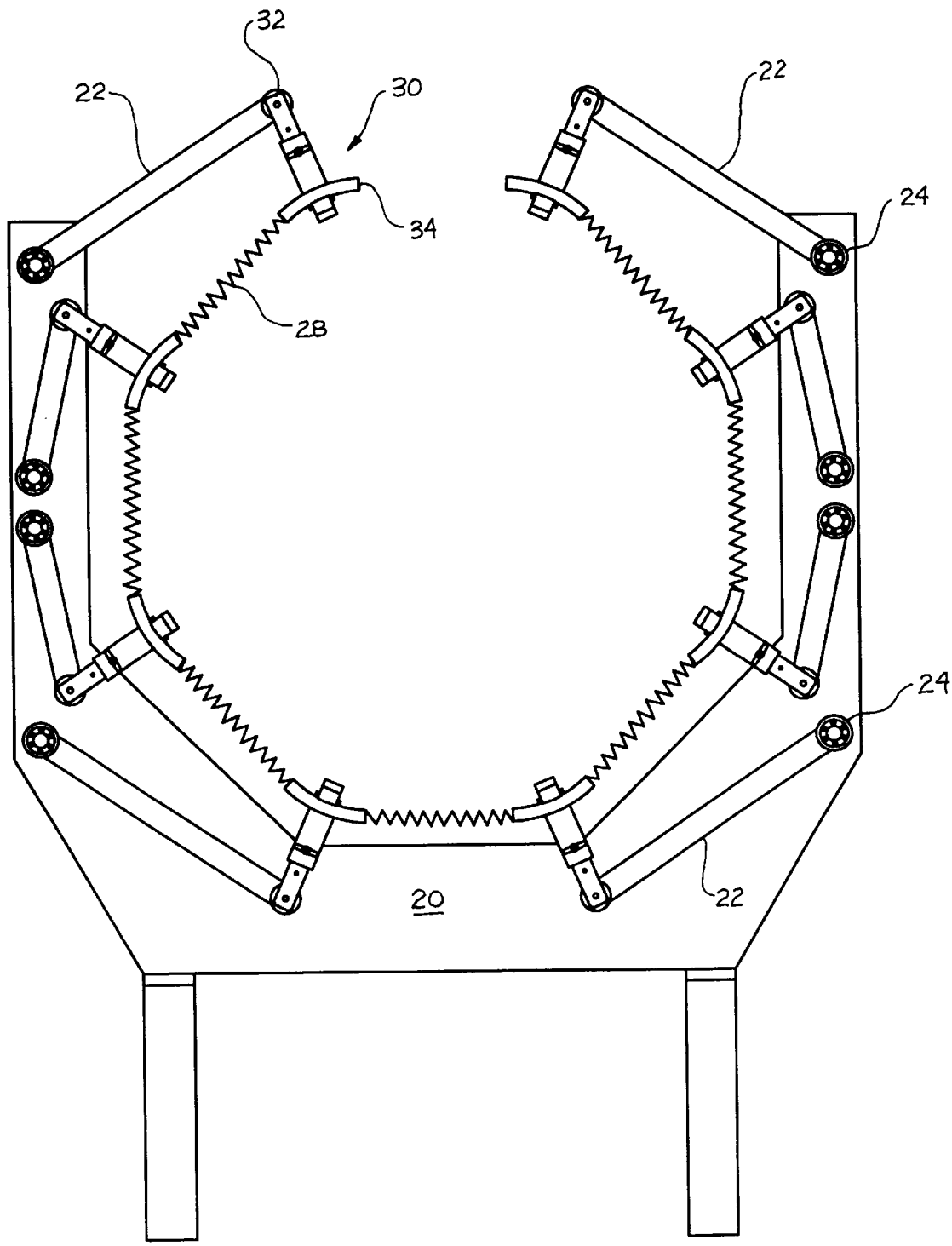
FIG. 2 is a front view of the envelope spreader of FIG. 1 in a spread position.

FIG. 1 shows a front view of an envelope spreader having quick adjusting spreader arms in accordance with the invention. The envelope spreader includes a frame 20 on which are mounted a plurality of articulated arms or swing arms 22. The swing arms 22 are mounted on pivot shafts 24 for pivoting movement between a closed position shown in Figure and an open position shown in FIG. 2.

The frame 20 houses the mechanisms for driving the pivoting movement of the swing arms, which typically includes a pneumatic powered gear transmission. The type of drive system is not a part of this invention and is not described in detail here. The invention is adaptable to any envelope spreader having pivoting, articulated arms or having pivoting arms with piston mounted jaws, as will be understood by those skilled in the art.

A spreader assembly 30 is attached to each of the swing arms 22 at a pivot joint 32. The spreader assemblies 30 each carry a hook or jaw 34 that engages the open edge of the envelope (not illustrated). The jaws 34 are interconnected with a spring or elastic element 28 that forms a ring for helping spread and hold open the envelope.

In a retreading plant, the envelope spreader machine is usually positioned along an overhead conveyor line so that a tire ready for curing can be moved to the machine. An envelope is positioned on the jaws 34 of the machine with the swing arms 22 in the closed position shown in FIG. 1. The machine is activated to pivot the swing arms 22 to the open position shown in FIG. 2, thus spreading the envelope open to accept the tire. After the tire is positioned in the envelope, the machine is then activated to pivot the swing arms 22 to the closed position to enclose the tire in the envelope.

As will be appreciated, the open and closed positions of the jaws 34 must be appropriate for the particular tire being fitted. Retreading operations will typically handle a variety of tire sizes. For example, a retread operation might currently see tires ranging from light truck sizes having an outside diameter of about 25 inches and a width of about 8 inches to wide base long haul tires having an outside diameter of about 45 inches and a width of about 18 inches.

Conventional envelope spreaders have a hook arm articulated at a free end of the articulated arm. The hook arm includes a shank with a series of holes and a hook carried at the end of the shank. The conventional hook arm may be fastened to the swing arm pivot joint 32 at any of the holes with a threaded bolt, which allows shortening or lengthening the hook arm as needed. Changing the position of the hook arms is time consuming, however, because the bolt must be unscrewed for removal, and screwed back on for replacement.

Figure 3:
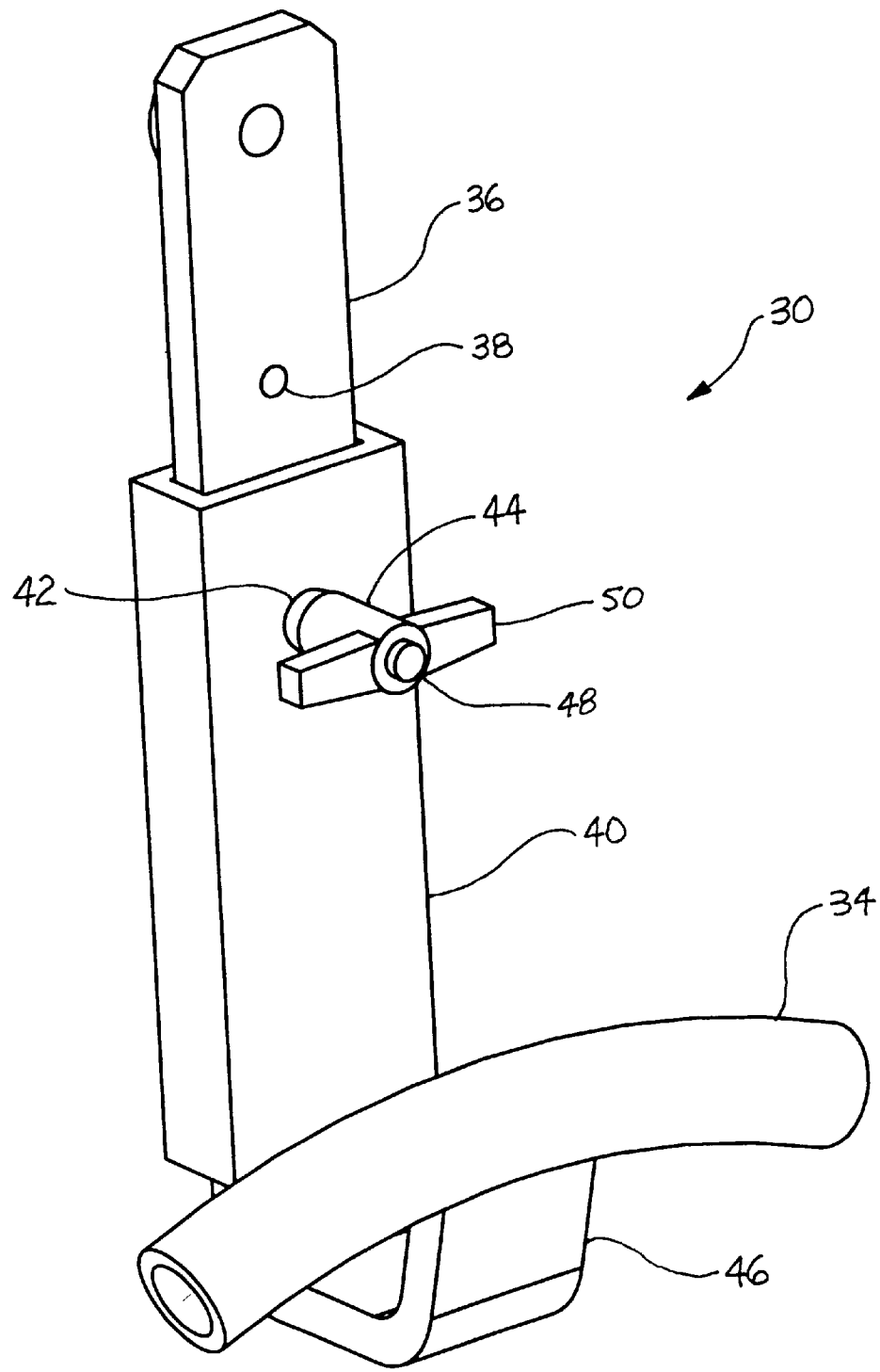
FIG. 3 is a perspective view of a spreader arm assembly.

FIG. 3 illustrates in perspective view an adjustable spreader assembly 30 in accordance with the invention. The spreader arm assembly 30 includes a spreader bar or arm 36 having a hole for mounting to the swing arm pivot joint 32. The spreader arm 36 also has a plurality of adjusting holes 38 spaced along its long axis.

A collar or sleeve 40 is slidably mounted on the spreader arm 36, with the spreader arm being inserted in the channel defined by the sleeve. The sleeve 40 includes a positioning hole 42 that is aligned with a selected one of the adjusting holes 38 of the spreader arm 36. A quick release pin 44 is inserted through the positioning hole 42 and selected adjusting hole 38 to secure the spreader arm 36 and sleeve 40 in the desired position.

A hook 46 extends from the end of the sleeve 40 and a rib 34 is attached at the tip of the hook. The hook 46 and rib 34 engage the envelope for spreading. The hook 46 can be welded or mechanically fastened in the distal end of the sleeve 40. Alternatively, the sleeve 40 can be formed so that the front wall is elongated to form the hook 46.

Figure 4:
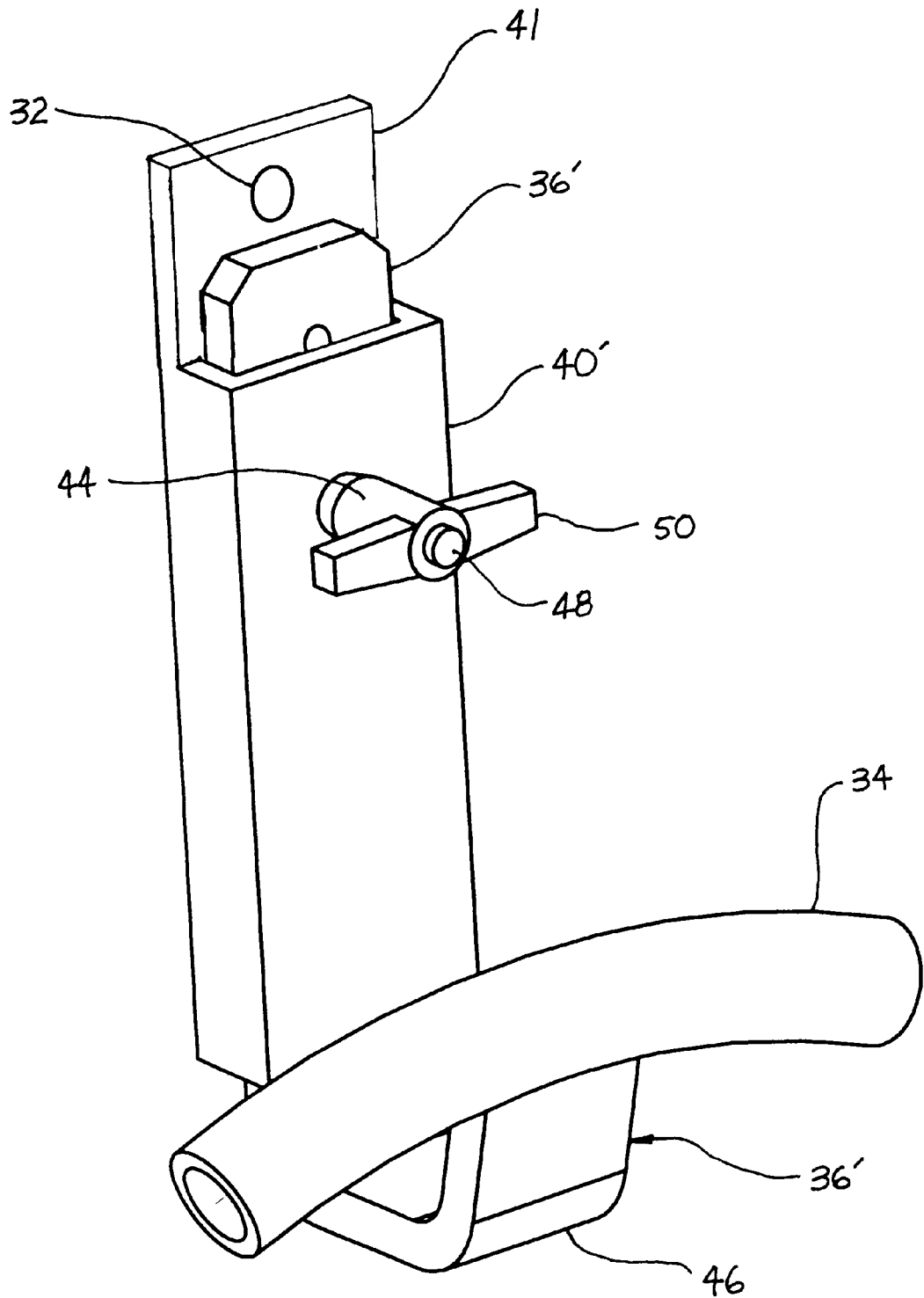
FIG. 4 is a perspective view of an alternative embodiment of the spreader arm assembly.

According to an alternative embodiment illustrated in FIG. 4, the sleeve 40' may be mountable to the swing arm 22 and the spreader arm 36' inserted as the adjustable member. A flange 41 is formed at the proximal end of the sleeve 40' and includes a mounting hole 32 for mounting to the swing arm 22. The hook 46 is formed at the distal end of the arm 36', which may be advantageous for manufacturing the invention. The rib 34 is attached to the hook 46 as described in the embodiment of FIG. 3.

The quick release pin 44 illustrated is a spring ball pin with a release button 48 and handle 50 to allow quick removal from the aligned holes. The spring ball secures the pin in place. Other quick release pins or rods could also be used, for example, a quarter turn fastener pin.

The sleeve 40 fits the spreader arm 36 sufficiently closely so that relative movement between the spreader arm and sleeve is minimized, and the forces involved in spreading the envelope are effectively transmitted for safe and reliable operation of the spreader arm assembly 30. The sleeve also allows the use of a single, quick release pin to attach to the spreader arm 36.

The spreader arm 36 and sleeve 40 are illustrated as being rectangular; however, a cylindrical rod and tube would also be suitable. In addition, the sleeve 40 need not be entirely enclosed; a channel shaped member having flanges to engage the edges of the spreader arm 36 could also be used. Other elements that engage for sliding movement only could also be used.

The invention has been described in terms of preferred principles and embodiments, however, those skilled in the art will recognize that substitutions may be made without departing from the scope of the invention as defined in the following claims.

We claim:

1. A quick adjusting spreader arm device for a tire casing envelope spreader, comprising:

a spreader arm assembly mountable at a pivot joint to a swing arm of an envelope spreader, the spreader arm assembly including an arm having a plurality of adjusting holes positioned axially along the spreader arm and a sleeve slidably engaged with the spreader arm and having a retaining hole extending transversely therethrough;

a jaw for holding an envelope connected to a distal end of the spreader arm assembly; and a quick release retaining pin selectably positionable in the retaining hole and one of said plurality of adjusting holes so that a distance between the jaw and the pivot joint is selectable.

2. The quick adjusting spreader arm device as claimed in claim 1, wherein the jaw includes a hook extending from the sleeve and a rib for engaging an envelope fastened at a free end of the hook.

3. The quick adjusting spreader arm device as claimed in claim 1, wherein the arm is pivotally attached to the swing arm, and the sleeve is slidably positioned on the arm.

4. The quick adjusting spreader arm device as claimed in claim 1, wherein the sleeve is pivotally attached to the swing arm and the arm is slidably inserted in the sleeve.

5. In an envelope spreader having a frame, a plurality of articulated arms pivotally mounted on the frame, and drive means for selectably pivoting the arms between a spread position and a closed position, the invention comprising:

a plurality of spreader assemblies, each assembly mounted to an articulated arm, each assembly having a bar with a plurality of adjusting holes positioned in axial alignment along the bar and a sleeve slidably engaged with the bar and having a retaining hole extending transversely therethrough;

a jaw for holding an envelope connected to the distal end of each assembly; and a plurality of retaining pins, each pin selectably positionable in the retaining hole of a sleeve and one of said plurality of adjusting holes of a bar so that a combined length of the bar, sleeve and jaw is selectable.

6. In the envelope spreader as claimed in claim 5, the spreader assembly including the bar being pivotally mounted to the articulated arm, and the sleeve slidably positioned on the bar.

7. In the envelope spreader as claimed in claim 5, the spreader assembly including the sleeve being pivotally attached to the articulated arm and the bar slidably inserted in the sleeve.

* * * * *